Jan. 29, 1924.
N. A. PRESTON
AUTOMOBILE LOCK
Filed Aug. 18, 1920
1,481,929
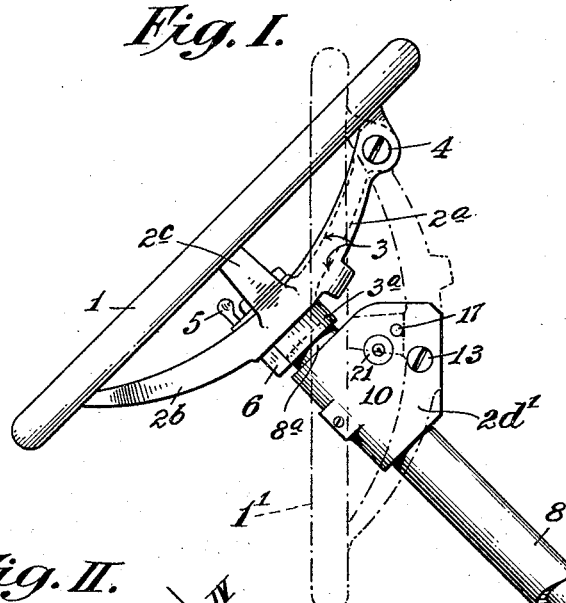
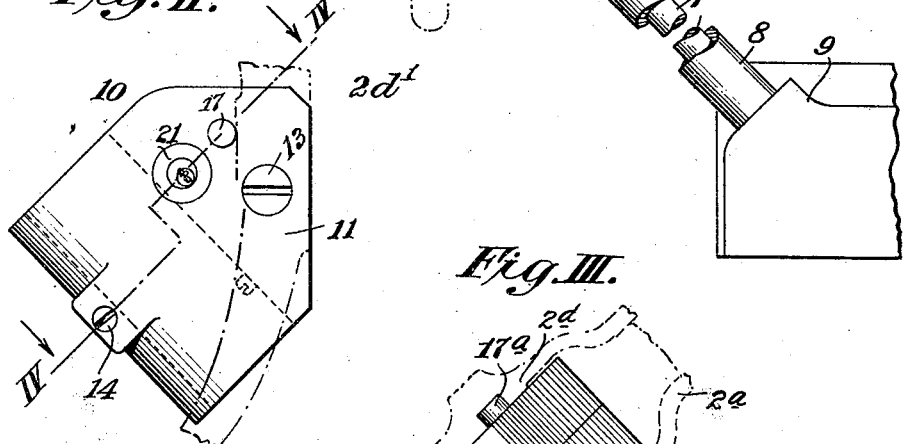
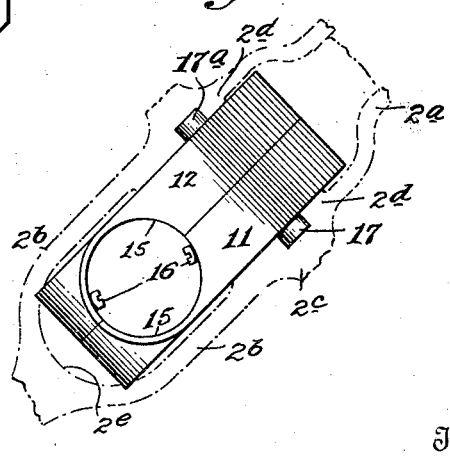
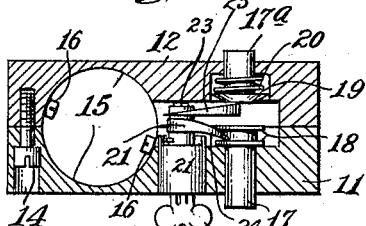
Inventor
Norman A. Preston
By [signature] Attorney Patented Jan. 29, 1924.

1,481,929

UNITED STATES PATENT OFFICE.

NORMAN A. PRESTON, OF NEW YORK, N. Y.

AUTOMOBILE LOCK.

Application filed August 18, 1920. Serial No. 404,360.

*To all whom it may concern:*

Be it known that I, NORMAN A. PRESTON, a citizen of the United States, residing in the city of New York, county and State of New York, have invented certain new and useful Improvements in Automobile Locks, of which the following is a specification, reference being had to the accompanying drawings, illustrative of one particular embodiment of my invention.

This invention relates to what is termed the locking of automobiles, to prevent their being used without authority. The locking of automobiles has involved locks for disconnecting the supply of fuel to the engine, or locking of the transmission or locking of the steering gear, and innumerable methods in a variety of forms,—in every case there being more or less objection to the efficiency of the device or the method.

My invention relates to the locking of the steering gear, and in particular locking the steering post or controlling the steering rod in a manner and by means of great advantage and simplicity. In the particular form herein shown, a tilting steering hand wheel, which of necessity is in normal position locked to the steering post to turn it, is so arranged and associated with parts that in the out-of-action position the same substantial parts used for steering afford means for locking the steering post against rotation to such extent as to prevent unauthorized use of the car. In particular, the rotation is prevented in the form shown by engagement of the steering wheel spider with a non-revoluble member suitably attached to the housing of the steering column, with associated means to hold the spider in the locking position, such additional means involving what is usually known as the locking parts subject to control by a key of any usual safety construction locked position.

The particular form herein described, is a tilting steering wheel which when down or out of action engages a lug clamp on the steering column, non-revoluble to the extent required for my object and a tumbler lock adapted in the most accessible position relative to the driver, to project a bolt or bolts to hold the spider in the locked position.

Fig. I is a side elevation of steering wheel and column with lock attached.

Fig. II is a side view of a locking mechanism.

Fig. III is a plan view of a locking mechanism.

Fig. IV is a section of a locking mechanism on line 4—4 of Fig. II.

The steering wheel 1 has the spider with the arms $2^a$, $2^b$ and $2^c$, and the bifurcated hub members $2^b$ with parallel opposed sides and the crotch $2^e$ at the bifurcation of the arm $2^b$.

A tilting support arm 3 has a hub $3^a$, and is pivoted at 4 to the spider arm $2^a$, while latch fingers 5 operate the usual latch release contained in a cap 6 attached to the hub $3^a$, with spring latch members adapted to lock the spider hub members $2^d$ in rigid steering position.

The tilting support arm hub $3^a$ is rigidly attached to the steering post 7, contained inside of the housing 8, the upper end of the housing $8^a$ being recessed into the spider tilting arm hub $3^a$. The lower end of the housing 8 is rigidly attached to a steering gear housing 9, and the steering post 7 passes through the housing into and connects with suitable gearing in any usual manner, to operate the steering gear supported in or on the steering gear housing 9, which latter is rigidly supported to some frame members of the chassis of an automobile.

The lock mechanism 10 may be variously embodied, but in the particular form shown it comprises the two parts 11—12 held together by the screw bolt 13 on one side and screw bolt 14 on the other side, after the two parts having each a complementary recess 15—15 are clamped around the upper end of the housing 8 at the upper end of the steering column. Within the complementary recesses a stud 16, or several studs, are provided to engage the lock bracket 10 and engage a hole or recess of desired size in the housing 8, but do not penetrate therethrough to any extent that would interfere with the turning of the steering post 7, and do not serve any purpose of locking the housing and the post together directly,— such stud or studs hold the lock bracket 10 rigidly against revolving and permit only the predetermined limits of turning on the steering housing. Two locking bolts 17—$17^a$ reciprocate in bearings in the respective parts 11 and 12. The inner end of 17 has a grooved wheel 18, and the inner end of 17ᵃ carries,—and may have a beveled head 19 and under the head a spring 20 contained in a recess in the locking mechanism side 12. Lock tumblers of any suitable form are supported at 21 to be engaged by key 22, and serve to operate a stud-shaft 23, having cams 24—25 each, respectively, engaging groove 18 and the beveled head 19 on the locking bolts 17 and 17ᵃ. These locking bolts 17 and 17ᵃ project from the opposite sides of locking mechanism 10, which sides fit closely between the opposed faces 2ᵈ—2ᵈ of the bifurcated hub of the steering wheel spider, so that the bifurcated tilting spider passes freely over the sides of the locking mechanism 10 with a close clearance so that the projecting of the locking bolts 17 and 17ᵃ will engage the bifurcated arms 2ᵈ—2ᵈ and hold the spider, and, therefore, the steering wheel in the tilted position out of place for normal operation. These locking bolts may be positioned on the lock 10 so that they will project into recesses on the inner faces of the bifurcated spider arm 2ᵈ—2ᵈ, so that the locking bolts will be blind and be free from tampering to injure the lock or release the steering wheel from its out-of-action position. The cam 25 may be modified, and may fill the entire space between the two heads of the locking bolts, for which bolt 17 may have a cooperating beveled head.

While the form herein particularly shown comprises the two-part casing 10, and the bolts holding the same together may be lock bolts to prevent removal, the bifurcated spider arm when passed over and locked in a position on either side of the locking clamp, serves to hold the two parts together, and thereby hold the locking mechanism rigidly attached to the steering column housing, and in turn prevent the rotation of the steering wheel and spider around the housing beyond the degree desired;—which in turn locks the steering post against any rotation which would permit practical driving of the car. The mechanism bolt 13 holding the two parts together on the steering column housing 18, is preferably so positioned that when the steering wheel spider is in the locked position the spider arms cover the bolt 13, thereby preventing access to the bolt and preventing tampering or removal. However, the two parts of the locking mechanism housing may be stampings with one edge suitably fashioned so that the two parts interlock on one side of the steering column, and when brought into fixed position a single bolt like 13 locks the other side and holds the entire locking mechanism in rigid or the desired non-rotatable relation with the steering column housing.

As shown, the steering wheel 1 tilts in the manner provided by construction now in use, into the position 1', so that the bifurcated spider members take the position 2ᵈ' and these bifurcated spider members being tilted at pivot 4 to the tilting support arm 3, which in turn is rigidly fastened to the upper end of the steering post 7, result in a rigid locking of the steering post 7 to the lock block 10 which is non-rotatably secured to the housing 8, thereby preventing relative turning of the steering post beyond the predetermined limit with respect to the housing. This locking against rotation is effected by the robust structural parts of the steering wheel and spider and the actual strain to prevent rotation is therefore resisted in a most effective manner, and the locking against unauthorized operation of the steering connections of the automobile is provided by the lock bolt which simply holds the parts effecting the resistance against motion in the position presenting the normal operation for driving of the car.

It will thus be seen that a usual form of tilting steering wheel which is swung out of position by the simple release by the latches 5, affords the desired accessibility provided by tilting wheels, but in addition affords the double purpose due to the presence of the nonrevoluble element attached to the steering column housing, of locking the wheel when in the tilted position, with the further element of a suitable individual control lock member to hold the tilted wheel in the locked position.

Suggestions have been made involving the projection of a locking bolt through the steering column, penetrating the walls of the housing and steering post or projecting into a solid steering post, but the large leverage of the steering hand-wheel is such that unauthorized attempts to use the automobile, effect a great strain and can readily damage the steering housing or the post or sheer the locking bolt when it is the sole source for the attempt to lock these members together. Furthermore, depending upon such a bolt in the manner just described, the jarring of an automobile may cause involuntary locking of the parts, which in the case of rapid driving involves the obvious great danger of a locking of the entire steering gear when the car is in motion, with the chance of very dangerous results.

Various modifications may be made with respect to detail of construction, and the invention may be varied to meet the requirements of other forms of steering hand-wheel arrangement and other tilting wheels besides that herein particularly shown and described,—but what I claim and desire to secure by Letters Patent is:

1. Locking means for an automobile, means comprising a tilting steering wheel, a solid rim and a frame therefor, a fixed steering housing, a non-revolvable multi-part lug clamped around said housing, a bifurcated portion in said frame adapted to enbrace said lug when the frame is in tilted position and a lock for holding said frame in engagement with the lug.

2. A tilting steering wheel and a frame member associated therewith and adapted to connect with and revolve a steering post, a housing associated with said steering post, a bifurcated frame member supporting wheel and pivoted to the member connected with the post, a locking lug clamped on said housing and means to limit the rotation thereon and adapted to be embraced by engagement on both sides by said bifurcated frame when the steering wheel is in tilted position, an individual means to control the disengagement of said bifurcated member from said lug.

3. A steering wheel locking device comprising a non-revoluble lug adaptably secured to the steering column housing, comprising two complementary parts clamping from either side of the housing, a bolt to secure said parts and locking bolts and key controlled locking mechanism adapted to laterally project the locking bolts.

4. A steering gear locking mechanism comprising a tilting steering wheel including a spider, a steering post housing, a locking lug clamped to a predetermined relative revolubility about said housing and adapted to be embraced on opposite sides by a bifurcated portion of said spider, an assembly bolt for said lug positioned whereby the same is covered by said bifurcated spider member when in tilted position and means for locking the spider bifurcated member by key control in its position embracing the lug.

5. A steering wheel for automobiles comprising a frame rigidly supporting a hand wheel, a steering shaft and a radial arm rigidly secured thereto, a pivot on said arm remote from the shaft engaging a pivot bearing on a bifurcated member of said frame, a non-revolvable housing surrounding the shaft, a lug adapted to be clamped around and removable from said housing, and arms on the bifurcated member of said hand wheel frame embracing in the tilted position said lug to prevent its removal from the housing.

6. A steering wheel mechanism comprising a steering shaft, a surrounding stationary housing, a radial arm rigidly attached to the shaft end, a spider hinged to said arm and supporting an integral hand wheel, a bifurcated member embodied in said spider and adapted to engage the steering shaft to turn the same when the wheel is in operative position and when hinged on said radial arm to engage the opposite sides of a lug, a two-faced lug clamped around said housing adapted to fit into said bifurcated member when the wheel is tilted and to hold the latter against rotary relative movement with respect to said housing.

7. A steering gear for automobiles comprising a steering shaft and a non-revolvable housing surrounding the same, a hinged hand wheel with integral rim and spider, a pivot for said spider on one side of the axis of the steering shaft, a bifurcated member on said spider extending from said pivot to a point on the opposite side of the steering shaft whereby the bifurcation laterally engages the hub on the steering shaft end and alternately swinging on the pivot laterally engages the housing, a non-revolvable block clamped to said housing and positioned to engage said bifurcated member when the wheel is in tilted position.

8. In a steering wheel for motor cars and the like, an integral hand wheel and spider, a tilting pivot support for said spider in proximity to the rim, a steering shaft and a block on the end thereof for engagement with the spider, a block of similar lateral conformation non-revolubly supported in proximity to the shaft and adapted to be engaged by said spider member alternately with the block on the shaft end, and means for locking the spider to said non-revolvable block.

9. In combination with a tilting steering hand wheel for automobiles, a housing for the steering shaft, a locking lug adapted to be clamped to said housing in proximity to the hand wheel, a bifurcated part of said hand wheel symmetrically disposed on either side lateral of the axis of the steering shaft housing and adapted to laterally engage said locking lug when the wheel is in tilted position.

10. A locking lug for a tilting steering wheel having a bifurcated portion disposed symmetrically on either side of the plane passing through the tilting pivot and the steering shaft axis, comprising two complementary parts adapted to be laterally clamped to a steering post housing, means to prevent rotation of said locking lug on the housing and means of engagement with the tilting wheel to hold said locking lug against displacement from the housing.

11. A locking lug for a tilting steering wheel comprising two complementary parts adapted to be laterally secured to a steering post housing, a member adapted to clamp said two parts in fixed position, means to prevent the revolving of said lug, lateral faces to engage the tilting steering wheel, a bifurcated part on said steering wheel co-acting with said lateral faces and covering the clamping member of said two-part lug whereby when in tilted position said lug is held against displacement from the housing, and a lock control member to hold the wheel in tilted position in engagement with said lug.

12. A bracket for locking tilting steering hand wheels, comprising a multi-part lug, parallel faces oppositely disposed adapted to engage the hand wheel spider, complementary recesses in the parts adapted to form a clamping engagement on the steering post housing, means associated with said recesses to prevent sliding on said housing and limit the rotary movement thereon, means for securing the parts of the bracket together, said means being positioned whereby they will be covered by parts of the steering hand wheel frame when in tilted position in engagement with the parallel sides of the bracket.

13. The combination of a steering column, a steering shaft, and a steering wheel irremovably secured to said steering shaft so as to rotate therewith, but adapted to tilt about an axle transverse of the axis of said shaft, so that it may be tilted from a normal operative to an out-of-the-way position; said steering column having a member, non-circular in cross section, disposed at the limit of tilting movement of the wheel, and said wheel having an opening in the wheel body adapted to embrace the column to permit tilting movement of the wheel, and means to engage with said non-circular member to prevent rotation of the wheel at the limit of its tilting movement, and cooperating key-lock parts on said member and wheel adapted to register when the wheel is in out-of-the-way tilted position.

14. The combination of a steering column, a steering shaft, and a steering wheel irremovably secured to said steering shaft so as to rotate therewith, but mounted on a pivot adapted to permit tilting movement of the wheel at right angles to its movement of rotation when in normal operative position, so that it may tilt from a normal operative to an out-of-the-way position; said steering column having a member non-circular in cross section, rigid therewith, disposed at the limit of tilting movement of the wheel; and a stop to limit the said tilting movement; said wheel having an opening in the wheel body adapted to embrace the column and permit tilting movement of the wheel, and means to engage with the non-circular member to prevent rotation of the wheel at the limit of its tilting movement to out-of-the-way position; and cooperating key-lock parts on said member and wheel adapted to register when the wheel is in out-of-the-way position against the stop.

In testimony whereof, I have signed my name to this specification, in the presence of two subscribing witnesses, this eleventh day of August, 1920.

NORMAN A. PRESTON.

Witnesses:
LUDWIG M. DIETERICH,
H. MUCHMORE.